United States Patent [19]
Chow

[11] 3,816,744
[45] June 11, 1974

[54] FAST RESPONSE AUTOMATIC BRIGHTNESS CONTROL CIRCUIT FOR SECOND GENERATION IMAGE INTENSIFIER TUBE

[75] Inventor: Sen-Te Chow, Alexandria, Va.

[73] Assignee: The United States of America as represented by the Secretary of the Army, Washington, D.C.

[22] Filed: Oct. 5, 1973

[21] Appl. No.: 403,728

[52] U.S. Cl......... 250/213 VT, 250/207, 250/214 R, 315/10, 178/DIG. 29
[51] Int. Cl............................................... H01j 31/50
[58] Field of Search......... 250/213 VT, 207, 214 R, 250/205, 206; 178/DIG. 29; 331/117 D; 315/10

[56] References Cited

UNITED STATES PATENTS

| | | | |
|---|---|---|---|
| 3,473,084 | 10/1969 | Dodge | 250/205 X |
| 3,553,459 | 1/1971 | Siedband et al. | 331/117 D |
| 3,691,302 | 9/1972 | Gaebele et al. | 178/DIG. 29 |
| 3,694,659 | 9/1972 | Ramsay et al. | 250/213 VT |
| 3,739,178 | 6/1973 | Chow | 250/213 VT |

*Primary Examiner*—Walter Stolwein
*Attorney, Agent, or Firm*—Edward J. Kelly; Herbert Berl; Max L. Harwell

[57] ABSTRACT

A fast response automatic bright source protection circuit for an image intensifier tube in which the amount of screen current, which is produced according to the light intensity of a target source, is sensed at the gate electrode of a junction FET. The gate electrode of the junction FET is connected between a resistor and a low junction capacitance diode that are serially connected in the path of the screen current. Since the diode has a very low junction capacitance, any fluctuation in the screen current has a very short transient time at the gate electrode of the junction FET. The drain electrode of the FET controls the drive of voltage regulated oscillators. The voltage regulated oscillator outputs are transformer coupled to voltage multipliers whose outputs produce large direct current bias voltages that are applied to the cathode, to the input and the output electrodes of a microchannel plate, and to the screen. These bias voltages applied to the input and output electrodes change inversely with any change of the screen current. Therefore, with the microchannel plate bias voltages varying inversely with the screen current, the brightness of the target source being viewed through the image intensifier remains constant at the output of the image intensifier tube.

3 Claims, 1 Drawing Figure

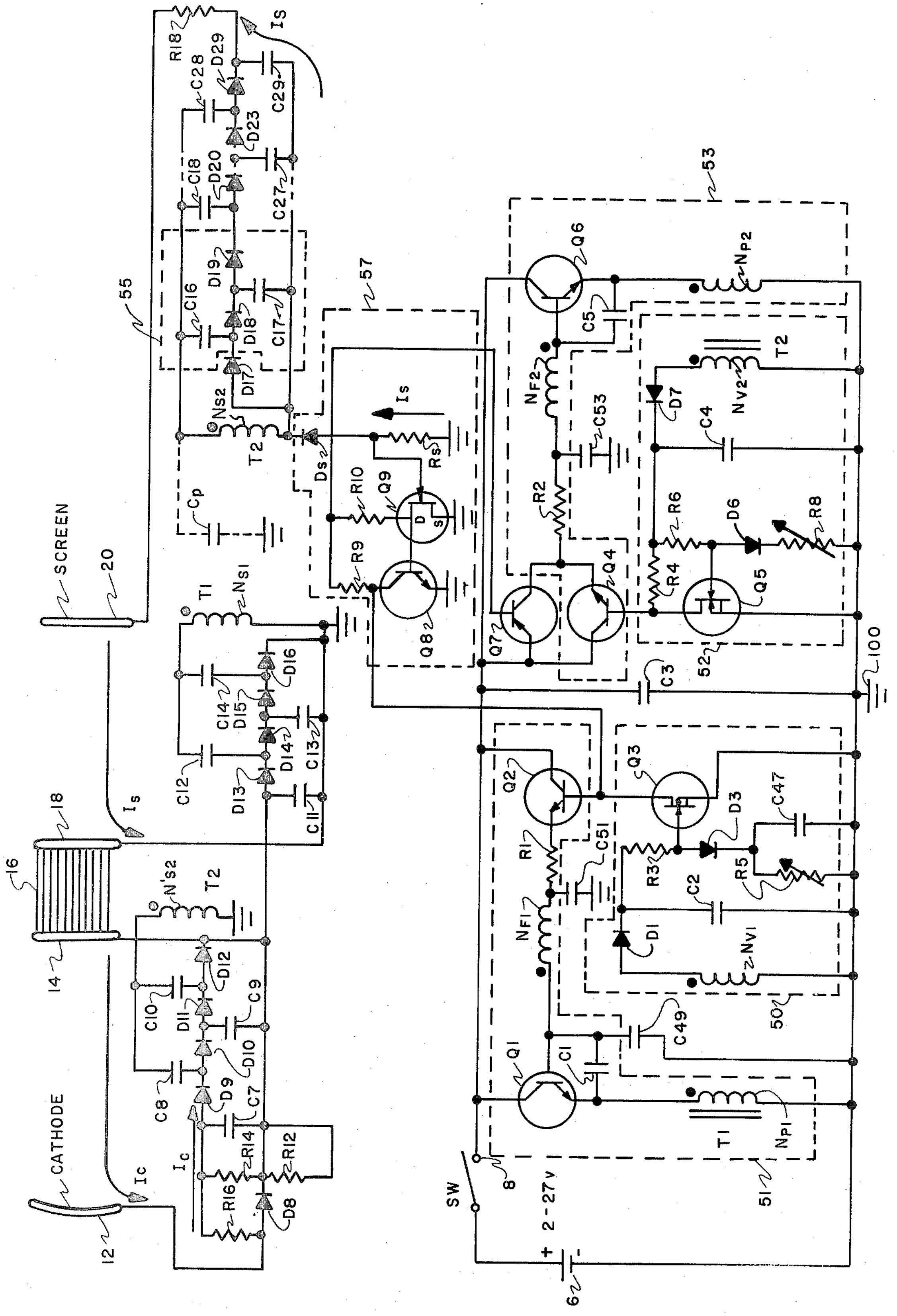
SCREEN
CATHODE
2-27v
SW

FAST RESPONSE AUTOMATIC BRIGHTNESS CONTROL CIRCUIT FOR SECOND GENERATION IMAGE INTENSIFIER TUBE

The invention described herein may be manufactured, used, and licensed by or for the Government for governmental purposes without the payment to me of any royalty thereon.

BACKGROUND AND SUMMARY OF THE INVENTION

This invention is an improvement over a previously filed patent application Ser. No. 253,744 to the present inventor, Sen-Te Chow, and now U.S. Pat. No. 3,739,178. This invention relates to an automatic bright source protection circuit for an image intensifier tube that has a much faster response time than previous bright source protection circuits. Previously, a capacitor was connected in parallel with a screen current sensing resistor so that the a.c. voltage component was bypassed. The drawback to having the capacitor in the circuit is that the RC time constant of the parallel resistor and capacitor is rather great and therefore the response time of the a.c. through the sensing resistor is so slow that the intensity of the target source being viewed flickers. In the present circuit, the capacitor is not present but a small capacitance diode is placed in series with the sensing resistor. The present circuit comprises two voltage regulated oscillators whose outputs are transformers coupled to three different voltage multipliers for amplifying the oscillator peak-to-peak output voltages to much larger direct current (d.c.) bias voltages. These d.c. bias voltages are connected to the cathode, to the input and output electrodes of a microchannel plate, and to the screen for stepping up the voltage on these elements. The voltage regulated oscillators are controlled by a junction FET that has its gate connected between the sensing resistor and the diode, which are further serially connected in the screen current path. When the target source being viewed becomes brighter, the screen current increases and the FET gate voltage becomes more negative. The voltage on the drain terminal of the FET decreases making the FET less conductive and, since the source terminal of the FET is connected to ground and the drain terminal of the FET is connected to the base of the voltage regulated N-P-N transistor oscillators, the base voltage of the N-P-N transistor oscillators are raised and the peak-to-peak outputs of the oscillators are reduced. The amplitude of the electron accelerating d.c. bias voltages at the output of the voltage multipliers are decreased accordingly, thus decreasing the screen current. Conversely, if the screen current decreases the amplitude of the bias voltage are increased. The apparent brightness of the target is therefore kept constant at the viewing end of the image intensifier.

BRIEF DESCRIPTION OF THE DRAWING

The FIGURE is a schematic diagram of the fast response automatic brightness control circuit of the present invention.

DESCRIPTION OF THE PREFERRED EMBODIMENT

The FIGURE illustrates a schematic of the fast response automatic bright source protection circuit and regulated power supply circuit for an image intensifier tube in which the power supply circuits consists of two base control regulated N-P-N transistor oscillator circuits 51 and 53. Oscillator circuit 51 furnishes the d.c. bias voltages for the input electrode 14 and output electrode 18 of microchannel plate 16. Oscillator circuit 53 furnishes the d.c. bias voltages for the cathode 12 and screen 20. A first constant current source 50 supplies base current to oscillator 51, and a second constant current source 52 supplies base current to oscillator 53. A voltage source 6, whose voltage is from 2 to 2.7 positive d.c. volts, is connected across the oscillator circuits 51 and 53 and the constant current sources 50 and 52 when switch SW is closed on terminal 8. With switch SW closed on terminal 8, the voltage of battery 6 is sufficiently large enough to break down P-N-P transistor Q7 by the positive voltage applied to the emitter of Q7. Transistor Q7 is called the starting transistor, and when broken down applies the 2 or more positive d.c. volts through its base circuit to the bases of transistors Q2 and Q4 through resistors R9 and R4, respectively. Transistors Q2 and Q4 are made conductive by this positive voltage applied to their bases. When Q2 and Q4 are conductive, the positive 2 volts is applied simultaneously across resistor R1 and coil $N_{F1}$ to the base of transistor Q1 of oscillator circuit 51 and across resistor R2 and coil $N_{F2}$ to the base of transistor Q6 of oscillator circuit 53. Resistors R1 and R2 are current limiting resistors that are used to avoid a fast rush of starting current to coils $N_{F1}$ and $N_{F2}$, respectively. A positive voltage is then built up at the bases of transistors Q1 and Q6 causing these transistors to momentarily become conductive and conduct a positive pulse to winding $N_{P1}$ of transformer T1 and to winding $N_{P2}$ of transformer T2. The polarity of the positive pulse on $N_{F1}$ and $N_{F2}$ and the corresponding polarity of the pulse on windings $N_{P1}$ and $N_{P2}$ of transformers T1 and T2, respectively, are shown by dot notation in the FIGURE. Coils $N_{F1}$ and $N_{F2}$ have about 10 percent more turns than winding $N_{P1}$ and $N_{P2}$ so that the base will be driven harder than the emitter in transistors Q1 and Q6, respectively, and oscillations will be sustained across capacitors C1 and C5. Capacitors C1 and C5 stop spurious oscillations caused by the high capacitance of the voltage multiplier circuits at the start of oscillations. Both oscillators 51 and 53 operate with a single train of positive current pulses at its output. Capacitor C3 reduces any ripples in the voltage from source 6. Capacitors C49, C51, and C53 provide alternating current paths to ground 100.

Constant current sources 50 and 52 both operate similarly. The circuit connections and operations of 50 and 52 in relation to the screen current sensing junction FET Q9 along with the entire fast response brightness control circuit 57 are discussed hereinbelow. A voltage is developed across winding $N_{V2}$ by transformer action from primary winding $N_{P2}$ of transformer T2. Diode D7 passes only the positive voltages from $N_{V2}$ through capacitor C4, thus developing a positive d.c. voltage on the top side of capacitor C4. The positive d.c. voltage on the top side of capacitor C4 furnishes bias voltages to the drain terminal of FET Q9 through resistor R10, to the collector of amplifier transistor Q8 and to the base of Q2 through resistor R9, to the base of Q4 through resistor R4, and to the base of MOS FET Q5 through resistor R6. Transistor Q2 and Q4 and MOS FET Q5 are thus rendered conductive. Simultaneously, MOS FET Q3 is rendered conductive by a positive voltage built up on the top side of capacitor C2. Diode D6, made of germanium, compensates for any temperature change of the transistor Q5 base-drain junction voltage. The value of variable resistor R8 determines the amplitude of oscillator 53 output pulses. The operation of the oscillator circuit 53 and constant current source 52 under changing bright target source conditions will be explained hereinbelow with reference to the various voltage multiplier circuits and the fast response automatic brightness control circuit 57.

Oscillator 53 steps up the low d.c. voltages of 2 to 2.7 volts to 500 volts peak-to-peak alternating current (a.c.) voltage across transformer T2 secondary winding $N_{S2}$ and to 100 volts peak-to-peak a.c. voltage on secondary winding $N^1_{S2}$. A 12-stage voltage multiplier steps up the 500 a.c. volts across winding $N_{S2}$ to about 6,000 d.c. volts. One component of the voltage multiplier, represented by dashed line block 55, illustrates the arrangement of charging capacitor C16 and the summing capacitor C17, along with guiding diodes D18 and D19. The diodes function to guide the positive voltages and sum the 500 volt multiples along the other 11 stages of the 12-stage multiplier. Diode D17 keeps the positive portion of the 500 peak-to-peak volts, applied across charging capacitor C16, guided toward summing capacitor C17. At the end of the 12-stage voltage multiplier, and across the last of the summing capacitors C29, a 6,000 d.c. volts potential is developed. This 6,000 d.c. volts is applied to screen 20 as a bias voltage.

The 100 peak-to-peak volts, across secondary winding $N^1_{S2}$, is applied to a first two-stage voltage multiplier. The first two-stage voltage multiplier comprises charging capacitors C8 and C10 and summing capacitors C7 and C9, along with diodes D9, D10, D11, and D12. The first two-stage voltage multiplier steps up the 100 peak-to-peak volts to 200 d.c. volts to furnish cathode 12 bias. The 200 d.c. volts cathode bias is connected to cathode 12 through cathode current limiting resistor R16. A clamping circuit, comprising resistors R12 and R14, and diode D8, clamps the cathode voltage within its stable region of operation. A voltage of 300 to 500 peak-to-peak volts is produced across secondary winding $N_{S1}$ at the output of transformer T1. This 300 to 500 volts peak-to-peak voltage is applied to a second two-stage voltage multiplier. The second two-stage voltage multiplier steps up the 300 to 500 peak-to-peak volts to 600 to 1,000 d.c. volts to furnish a bias across front electrode 14 and back electrode 18 of microchannel plate 16.

A clamping circuit, connected between cathode 12 and electrode 14 of microchannel 16, comprises a cathode current limiting resistor R16, diode D8, and resistors R12 and R14. The clamping circuit protects the cathode under bright target source conditions. When the target source being viewed becomes brighter, cathode current increases and the cathode voltage decreases. Resistor R16 drops the cathode voltage and limits the cathode current $I_c$. Diode D8 and resistors R12 and R14 keep the image intensifier operating in the stable region even when the target source is at a very high input light level. A slight disturbance in the input light of the target source or a change in the power supply could cause a drastic change in the cathode current $I_c$ flowing from electrode 14 to cathode 12. Such a drastic change of $I_c$ will cause the tube to flicker. This flicker, or instability, problem can be solved by clamping the cathode voltage at a stable point, represented by $V_p$. Resistors R12 and R14 divide the cathode supply voltage, represented by $V_k$, taken at the output of the first two-stage voltage multiplier. A typical value for resistor R12 is 66 megohms, and a typical value for resistor R14 is 0.62 megohms. The voltage across resistor R14 is then by the voltage divider method, $$V_p = R14/R12 + R14) \times V_k,$$

or about 3 volts. Therefore, the voltage across resistor R14, which is represented by $V_p$, remains clamped at 3 volts. This 3 volts is in the stable region of operation, therefore, the tube remains clamped in the stable region of operation.

The value of the cathode current limiting resistor R16 is typically 50 gigaohms when using the above mentioned values of resistors R12 and R14. At low input light levels, diode D8 will be reverse biased since the cathode current will be lowered. Conversely, at the bright target source condition, the cathode current will increase and cathode voltage will decrease. The most salient feature of this clamping circuit is that of clamping the cathode voltage at a value high enough to be outside the unstable region of operation. For example, whenever the cathode voltage decreases to the value of $V_p$ and diode D8 is assumed to be ideal, the diode D8 will conduct and cathode voltage will be clamped to voltage $V_p$. Thus tube flicker will not occur. Using an actual diode in the conductive mode of operation, however, there is a forward voltage drop across diode D8 and some reverse leakage current flowing back through D8. The actual clamping voltage of the tube when D8 is conducting is then $V_p$ minus the forward voltage drop. In the nonconducting mode, the effective impedance in series with the cathode is resistor R16 in parallel with the reverse resistance of diode D8. It is therefore preferrable to select a low reverse leakage current characteristic diode for D8.

A sensing resistor $R_s$ detects the screen current $I_s$ flowing in its return path from output electrode 18 back to screen 20. The voltage on the gate of FET Q9 is the voltage drop across resistor $R_s$ that is caused by the screen current flowing through resistor $R_s$. Junction FET Q9, N-P-N transistor Q8, diode $D_s$, transformer stray capacitance $C_p$, and resistors $R_s$, R9, and R10 from the fast response automatic brightness control circuit 57. Control circuit 57 automatically maintains the output brightness of the image intensifier tube constant and operates in the following manner. When the input brightness from a target source increases, more electrons are emitted from cathode 12 and consequently more electrons flow through the image intensifier tube to screen 20. The screen current $I_s$ increases and the voltage drop across sensing resistor $R_s$ increases, causing junction FET Q9 to be less conductive and thus raises the resistance across Q9. The potential at drain terminal D of Q9 increases, approaching the 2 plus d.c. volts of source 6. With the drain terminal D connected to the base of N-P-N transistor amplifier Q8, the increased potential causes Q8 to become more conductive thus lowering the voltage at the base of Q2. The current through Q2 is reduced and the base current of transistor Q1 is also reduced, thus reducing the peak-to-peak voltage at the output of oscillator circuit 51. Reduction of the peak-to-peak voltage at the output of oscillator 51 reduces the output of the second two-stage voltage multiplier, and thus reduces the gain in the microchannel plate 16. Conversely, should the brightness of the source being viewed become less, FET Q9 will become more conductive and oscillator 51 will drive harder, thus increasing the electron multiplying voltage across microchannel plate 16. Diode $D_s$ is in series with current sensing resistor $R_s$ to limit voltage oscillations caused by spurious voltages from the screen. A type LVMB diode is used as diode $D_s$. This type diode has very little capacitance. Diode $D_s$ and capacitor $C_p$ , shown in dashed lines and representing stray capacitance from transformer $N_{s2}$, are connected in parallel and function as a half wave rectifier. Thus, the charging current to capacitor $C_p$ flows through resistor $R_s$ only at the time the oscillator 53 is started. Therefore, after initial start of the oscillator circuits 51 and 53 and the steady stage operation is established, the only currents through sensing resistor $R_s$ are the d.c. screen current, represented by $I_s$, and a very small part of the a.c. coupling current through the junction capacitance of diode $D_s$. With the selection of small junction capacitance diodes $D_s$, the a.c. noise in circuit 57 is greatly reduced and the RC time constant is much less than in previous automatic brightness control circuits that had a capacitor in parallel with the sensing resistor. Resistor R18 is in series with the automatic brightness control circuit 57 and screen 50 to limit voltage oscillations in case the screen shorts. Therefore, a very fast response is obtained from the present fast response automatic brightness control circuit since the capacitance within the circuit is very small.

It should be understood, of course, that the foregoing disclosure relates to only a preferred embodiment of the invention and that numerous modifications or alterations may be made therein without departing from the spirit and the scope of the invention as set forth in the appended claims.

I claim:

1. An improved fast response automatic brightness control circuit for an image intensifier comprising a direct current voltage source and first and second oscillator and constant current source means for amplifying and converting said direct current voltage source into a first and a second train of positive pulses, a first, a second, and a third voltage multiplier means wherein said second voltage multiplier means amplifies said first train of positive pulses into a much larger direct current voltage and said first and third voltage multiplier means amplifies said second train of positive pulses into much larger positive direct current voltages with the output from said first voltage multiplier means applied to a cathode and the output of said second voltage multiplier means applied across the input and output electrodes of a microchannel plate and the output of said third voltage multiplier means applied to a screen, and a clamping circuit connected between said cathode and said input electrode to clamp the cathode voltage into its stable region, the improvement being in an automatic brightness control circuit that comprises:

a screen current sensing resistor and diode serially connected in the screen current path;

an N-P-N transistor amplifier having base, collector, and emitter electrodes wherein the emitter electrode is connected to ground and the collector electrode is connected to said first oscillator and constant current source means for controlling the amplitude of the train of positive pulse therefrom;

a junction FET having a base electrode connected between said sensing resistor and said diode, a source electrode connected to ground, and a drain electrode connected to the base electrode of said N-P-N transistor amplifier wherein any change in screen current biases the base electrode of said junction FET to inversely change the amplitude of said train of positive pulses at the output of said first oscillator and constant current source means that are applied to the input to said second voltage multiplier means and to the input and output electrodes of said microchannel plate for automatically stabilizing the screen current.

2. An improved fast response automatic brightness control circuit as set forth in claim 1 wherein said diode is a low junction capacitance diode.

3. An improved fast response automatic brightness control circuit as set forth in claim 2 wherein said diode is a LVMB type diode.

* * * * *